US012756204B2

(12) United States Patent
Alvi et al.

(10) Patent No.: US 12,756,204 B2
(45) Date of Patent: Oct. 6, 2026

(54) LOW VOLTAGE CHARGING SYSTEM FOR HIGH VOLTAGE RECHARGEABLE ENERGY STORAGE SYSTEM

(71) Applicant: GM GLOBAL TECHNOLOGY OPERATIONS LLC, Detroit, MI (US)

(72) Inventors: Muhammad H. Alvi, Troy, MI (US); Mohamed Kamel, Birmingham, MI (US); Chandra S. Namuduri, Troy, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 606 days.

(21) Appl. No.: 18/452,796

(22) Filed: Aug. 21, 2023

(65) Prior Publication Data

US 2025/0070586 A1 Feb. 27, 2025

(51) Int. Cl.
*H02J 7/06* (2006.01)
*B60L 53/14* (2019.01)
*B60L 58/20* (2019.01)

(52) U.S. Cl.
CPC ................ *H02J 7/06* (2013.01); *B60L 53/14* (2019.02); *B60L 58/20* (2019.02); *B60L 2240/547* (2013.01); *H02J 2207/20* (2020.01)

(58) Field of Classification Search
CPC ...... H02J 7/06; H02J 2207/20; H02J 2105/37; B60L 53/01; B60L 53/22; B60L 58/20; B60L 2240/547; B60L 7/342; B60L 58/10; B60L 58/12; B60L 58/24; B60L 2210/30; Y02T 10/70; Y02T 10/7072
See application file for complete search history.

(56) References Cited

U.S. PATENT DOCUMENTS

| | | | | |
|---|---|---|---|---|
| 11,407,324 B2 * | 8/2022 | Bode | ...................... | B60L 53/14 |
| 2024/0072536 A1 * | 2/2024 | Lee | ........................ | H02J 1/084 |

FOREIGN PATENT DOCUMENTS

| | | |
|---|---|---|
| DE | 102019125734 A1 | 3/2021 |

* cited by examiner

*Primary Examiner* — Matthew Mikels
(74) *Attorney, Agent, or Firm* — Quinn IP Law

(57) ABSTRACT

A low voltage (LV) charging system for charging a high voltage (HV) rechargeable energy storage system (RESS), such as a HV RESS operable for electrically powering a traction motor of an electric vehicle. The LV charging system may include an input configured for receiving LV electrical power from a LV source and a distributed converter system configured for charging a plurality of modules of the HV RESS via a plurality of charging circuits. The charging circuits may be configured for separately charging one of the modules with a charging electrical power derived from converting the LV electrical power. The LV charging system may further include a controller configured for individually controlling the charging electrical power provided via each of the charging circuits.

20 Claims, 4 Drawing Sheets

LOW VOLTAGE CHARGING SYSTEM FOR HIGH VOLTAGE RECHARGEABLE ENERGY STORAGE SYSTEM

INTRODUCTION

The present disclosure relates to a charging system suitable for charging rechargeable energy storage systems (RESSs), such as but not necessarily limited to a low voltage (LV) charging system operable for charging HV RESSs of a vehicle.

Some vehicles may rely partially or entirely on a rechargeable energy storage system (RESS) to store and supply electrical power for a traction motor used to propel the vehicle. The RESSs may operate at a high voltage (HV) relative to other systems that may operate at a low voltage (LV). Some vehicles, for example, may employ HV charging systems to charge the RESS, such as via direct current (DC) fast charging (DCFC), 120/240 alternating current (AC) utility power grid based charging systems, onboard battery charging modules (OBCMs), and/or other systems configured for providing HV electrical power or other electrical power at voltages greater than those typically associated with LV operations. Situations may arise whereby the vehicle may be used in such a manner that charging the RESS via such HV charging systems may be impractical or impossible, e.g., when regenerative braking may be unavailable, the RESS has been overly discharged, and the vehicle is unable to connect to a utility power grid and/or another vehicle.

SUMMARY

One non-limiting aspect of the present disclosure relates to a charging system configured for charging a rechargeable energy storage system (RESS) using electrical power provided from a source. The charging system may be configured as a low voltage (LV) charging system operable for charging a high voltage (HV) RESS using LV electrical power provided from an LV source. The LV charging system may be used to charge the RESS and/or provide other jumpstart capabilities when HV or other charging system dependent on higher voltages may be unavailable. The LV charging system, for example, may be used to facilitate charging the RESS, jumpstarting vehicle controllers, etc., utilizing LV electrical power sourced from an LV battery, like a 12 VDC battery capable of being removably connected to the LV charging system via receptacles included onboard a vehicle.

One non-limiting aspect of the present disclosure relates to a low voltage (LV) charging system for charging a high voltage (HV) rechargeable energy storage system (RESS). The LV charging system may include an input configured for receiving LV electrical power from a LV source, a distributed converter system configured for charging a plurality of modules of the HV RESS via a plurality of charging circuits configured for separately charging one of the modules with a charging electrical power derived from converting the LV electrical power, and a controller configured for individually controlling the charging electrical power provided via each of the charging circuits.

Each charging circuit may include a bidirectional converter configured for converting the LV electrical power to the charging electrical power.

The controller may be configured for independently controlling a charging current output from each of the bidirectional converters via the charging circuit associated therewith.

The controller may be configured for controlling each of the bidirectional converters to simultaneously output the charging current at an approximately equal amount.

The controller may be configured for controlling each of the bidirectional converters to simultaneously output the charging current at differing amounts.

The controller may be configured for determining a temperature for each of the modules, determining a temperature threshold for each of the modules, and determining the differing amounts individually for each of the charging currents based on a difference between the temperature and the temperature threshold for the module associated therewith.

The controller may be configured for determining a state of charge (SOC) for each of the modules, determining a SOC threshold for each of the modules, and determining the differing amounts individually for each of the charging currents based on a difference between the SOC and the SOC threshold for the module associated therewith.

Each of the modules may correspond with a grouping of two or more different ones of a plurality of battery cells included as part of the HV RESS.

The bidirectional converters may be direct current (DC)-to-DC converters operable for converting the LV electrical power to the charging electrical power, optionally with the charging electrical power of each converter being provided at a greater voltage than the LV electrical power and at lower voltage than a HV output of the HV RESS.

The bidirectional converters may be alternating current (AC)-to-direct current (DC) converters for converting the LV electrical power to the charging electrical power, optionally with the charging electrical power of each converter being provided at a greater voltage than the LV electrical power and at lower voltage than a HV output of the HV RESS.

The bidirectional converters may include a ground electrically isolated from a ground of the HV RESS.

The charging electrical power may be operable for jump-starting a RESS controller associated with each of the modules.

The LV charging system may include a port protection module configured for electrically interconnecting the LV source with the input, the port protection module including a reverse polarity prevention circuit configured for preventing least one of a reverse polarity and an over voltage connection between the LV source and the input.

The HV RESS, the distributed converting system, the input, and the port protection module may be onboard a vehicle configured to power a traction motor with HV electrical power provided via the HV RESS, and the LV source may be removably connected to the port protection module via receptacles included onboard the vehicle.

One non-limiting aspect of the present disclosure relates to a low voltage (LV) charging system for charging a high voltage (HV) rechargeable energy storage system (RESS) included onboard a vehicle. The RESS may be configured for providing HV electrical power to a traction motor to propel the vehicle. The LV charging system may include an input configured for receiving LV electrical power from a LV source removably connected to receptacles included onboard the vehicle, optionally with the LV source being independent of a LV RESS included as part of a LV bus of the vehicle, a distributed converter system configured for charging the HV RESS via a plurality of bidirectional converters configured for separately charging one of a plurality of modules of the HV RESS with a charging electrical power derived from converting the LV electrical power, and a controller configured for individually controlling the charging electrical power provided via each of the bidirectional converters.

The controller may be configured for controlling each of the bidirectional converters to simultaneously output a charging current to the module associated therewith at an approximately equal amount when at least one of a state of charge (SOC) and a temperature of each of the modules is approximately equal and to simultaneously output the charging current at differing amounts when at least one of the SOC and the temperature of each of the modules is unequal.

The bidirectional converters may be configured for converting HV electrical power provided from the HV RESS to direct current (DC) electrical power suitable for distribution over the LV bus.

The bidirectional converters may be configured for converting HV electrical power provided from the HV RESS to at least one of direct current (DC) electrical power and alternating current (AC) electrical power suitable for distribution offboard the vehicle via the receptacles.

The controller may be configured for controlling each of the bidirectional converters to simultaneously output current to the receptacles at differing amounts.

One non-limiting aspect of the present disclosure relates to a charging assembly for charging a battery pack included onboard a vehicle. The battery pack may be configured for powering a traction motor to propel the vehicle. The charging system may include an input configured for receiving input electrical power from a source removably connected to receptacles of the vehicle, a distributed converter system configured for charging a plurality of modules of the battery pack via a plurality of bidirectional converters configured for separately charging one of the modules with a charging current derived from converting the input electrical power, and a controller configured for individually controlling the charging current provided via each of the bidirectional converters.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
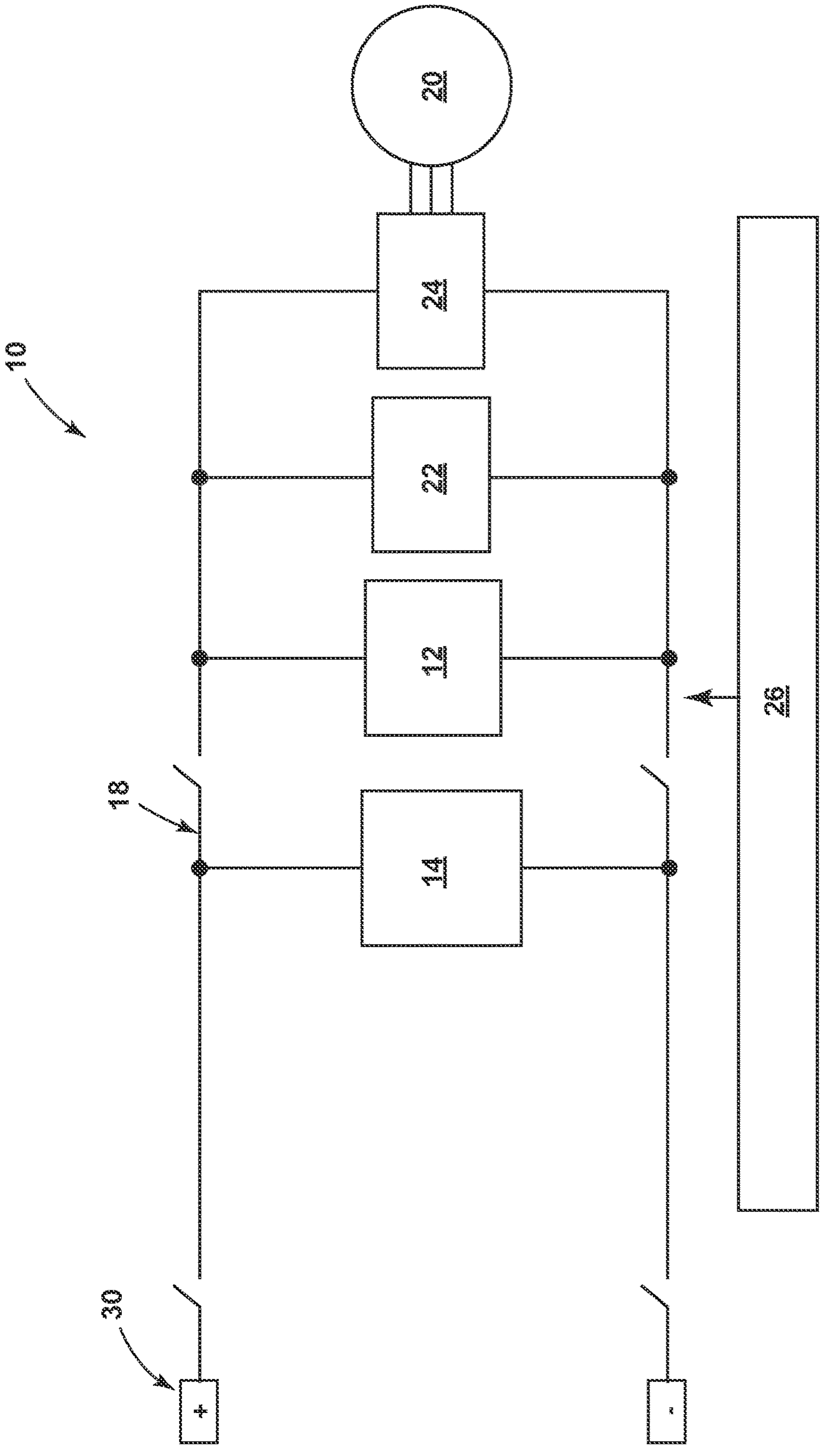
FIG. 1 illustrates a partial schematic view of a vehicle having a charging system in accordance with one non-limiting aspect of the present disclosure.

FIG. 1 illustrates a partial schematic view of a vehicle 10 having a charging system 12 in accordance with one non-limiting aspect of the present disclosure. The vehicle 10 may be of the type reliant upon a rechargeable energy storage system (RESS) 14 to facilitate storing and supplying electrical power. The RESS 14, for example, may be configured to facilitate exchanging high voltage (HV) electrical power over an HV bus 18 for purposes of electrically powering a traction motor 20 configured for propelling the vehicle 10. The vehicle 10 may include a wide variety of additional systems onboard to facilitate operations associated with the traction motor 20 and/or other vehicle systems associated with the HV bus 18. As one skilled in the art will appreciate, the vehicle 10 may include differing systems to facilitate controlling, managing, supporting, and otherwise directing activities associated with the traction motor 20, the RESS 14, and/or other vehicle systems dependent on exchanging electrical power therewith, which are shown for exemplary purposes to include an automotive performance management (APM) system 22, traction power inverter module (TPIM) 24, and a battery management system (BMS) and vehicle controller 26. The vehicle 10 may include a plurality of switches for selectively connecting and disconnecting the RESS 14 from the HV bus 18, such as to facilitate connecting and disconnecting the RESS 14 with a direct current (DC) fast charging system output 30 and/or the charging system 12, APM 22, TPIM 24, etc.

The schematic shown in FIG. 1 is not intended to describe each system that may be operable with the RESS 14 as the present disclosure fully contemplates the vehicle 10 including less systems and/or a wide variety of other systems, connections, controllers, etc. While not shown, and optionally in addition to or in place of the DCFC system 30, the vehicle 10 may include a 120/240 alternating current (AC) utility power grid based charging system, an onboard battery charging module (OBCM), and/or other system(s) configured for charging the RESS 14 independently of the charging system 12. Such systems, for example, may be used to facilitate charging the RESS 14 according to electrical power provided from regenerative braking, fuel cells or other onboard generation systems, and/or through offboard systems, like DC and/or AC charging stations, vehicle-to-vehicle (V2V), vehicle-to-grid (V2G) and vehicle-to-everything (V2X) systems, etc. While the charging system 12 may be advantageous in other applications, both onboard and/or off for the vehicle 10, such as with other types of vehicles or non-vehicle devices, the charging system 12 is predominantly described for use with the vehicle 10 to demonstrate its beneficial capabilities for charging, jumpstarting, or otherwise enabling operation of the vehicle 10 when some or all of the aforementioned, other charging systems may be unavailable, e.g., when situations arise whereby the vehicle 10 may be used in such a manner that charging the RESS 14 via other systems operating independently of the charging system 12 may be impractical or impossible. Such a scenario may arise when regenerative braking may be unavailable, the RESS 14 has been overly discharged, and the vehicle 10 is unable to electrically connect to a utility power grid and/or another vehicle 10.

Figure 2:
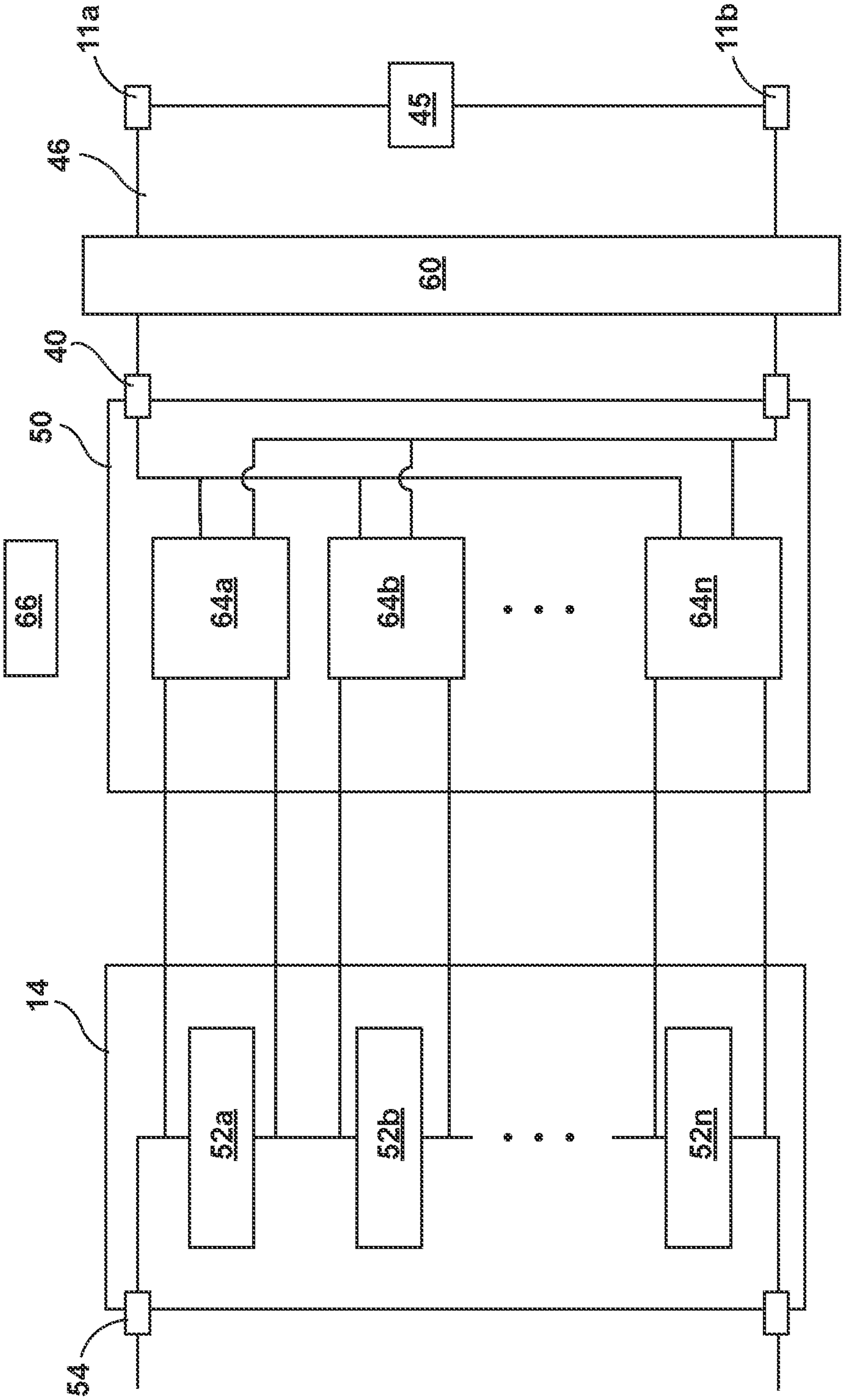
FIG. 2 illustrates a partial schematic view of the charging system in accordance with one non-limiting aspect of the present disclosure.

FIG. 2 illustrates a partial schematic view of the charging system 12 in accordance with one non-limiting aspect of the present disclosure. The charging system 12 may include an input 40 configured for receiving electrical power from a source 42, such as but not necessarily limited to receiving low voltage (LV) electrical power from a LV battery removably connected to the vehicle 10 via a plurality of receptacles 11*a*. 11*b*. At least in this context, i.e., when LV electrical power is being sourced from an LV source 42, such as from a removable 12 VDC battery, the charging system 12 may be characterized as an LV charging system 12. Similarly, the RESS 14 may be considered as an HV RESS 14 when operating with the LV charging system 12 due to the HV RESS 14 optionally exchanging HV electrical power, e.g., power having greater current and/or voltage than the LV electrical power, with the traction motor 20 or other systems onboard the vehicle 10. This is done for non-limiting purposes to differentiate LV powering, voltages, current, etc. associated with the LV charging system 12 from HV powering, voltages, currents etc. used elsewhere onboard the vehicle 10, such as over the HV bus 18. The LV charging system 12 may optionally be included as or part of the APM 22, however, the present disclosure fully contemplates the LV charging system 12 being separate from and/or capable of operating independently of the APM 22. The LV charging system 12 may be connected to a LV bus 46 of the vehicle 10, which in turn, and as described in more detail below, may be used for distributing LV DC and/or AC electrical power to other systems onboard and/or offboard the vehicle 10.

The LV charging system 12 may include a distributed converting system 50 configured for charging and/or discharging the HV RESS 14. The HV RESS 14 may correspond with a wide variety of systems capable of being electrically charged and discharged for purposes of storing and supplying electrical power, which in the exemplarily illustration may correspond with storing and supplying HV electrical power for powering the traction motor 20 and/or load connected to the LV bus 46. One non-limiting aspect of the present disclosure relates to the HV RESS 14 being configured as a battery pack comprised of a plurality of individual battery cells, such as the type of battery pack commonly employed with electric vehicles. The battery cells may be electrochemical devices having individual housings or canisters with suitable anodes, cathodes, electrolytic material, etc. cooperating to store and supply electrical power. The individual battery cells may be grouped in series and/or in parallel into separate modules 52*a*, 52*b*, 52*n*, optionally with each module being associated with a selectable portion of the battery cells. The modules 52*a*, 52*b*, 52*n* may be electrically interconnecting in series and/or parallel to facilitate providing an HV voltage output 54 to the HV bus 18 or other feature onboard the vehicle 10. While the present disclosure fully contemplates the battery cells being grouped according to different methodologies, the use of the modules 52*a*, 52*b*, 52*n* may be beneficial in providing discrete groupings of battery cells capable of being individually charged, with the outputs thereof being combined to provide the HV output 54.

In the illustrated configuration, the modules 52*a*, 52*b*, 52*n* are shown as being connected in series such that the HV DC output 54 of the HV RESS 14 may correspond with a summation of the voltages across each of the individual modules 52*a*, 52*b*, 52*n*. The modules 52*a*, 52*b*, 52*n*, at least in this regard, may be considered as having an intermediary power or operating level, e.g., as being operable to source and/or supply intermediary electrical power at levels greater than the LV electrical power and less than the HV electrical power, i.e., at intermediary levels therebetween. The references herein to LV, HV, and intermediary electrical power, voltages, currents etc. are presented for illustrative purposes and without intending to limit the scope and contemplation of the present disclosure. The charging system 12 and/or other systems, etc. onboard the vehicle 10 are not necessarily limited to any particular voltage differentiation delineated according to LV, HV, and/or intermediary values. By way of example, and in the event the HV electrical power is defined to be provided at 200, 400, and/or 800 VDC and the RESS 14 includes 10 modules 52*a*, 52*b*, 52*n*, it may be desirable for the modules 52*a*, 52*b*, 52*n* to each correspondingly provide the intermediary electrical power at 20, 40, and/or 80 VDC. For the sake of simplifying presentation, the charging system 12 may be correspondingly configured to provide the desired intermediary and HV electrical powers from the LV electrical power, e.g., based 12 VDC electrical power provided from the LV source 42.

A port protection module 60 may be provided between the receptacles 11*a*, 11*b* and the distributed converting system 50 and include a reverse polarity prevention circuit (not shown) configured for preventing a reverse polarity connection and/or an over voltage between the LV source 42 and the input. The distributed converting system 50 may be configured for charging the modules 52*a*, 52*b*, 52*n* via a plurality of charging circuits 64*a*, 64*b*, 64*n*. The charging circuits 64*a*, 64*b*, 64*n* may be configured for separately charging a corresponding one of the modules 52*a*, 52*b*, 52*n* with a charging electrical power derived from converting the LV electrical power provided via the LV source 42. A controller 66 may be configured for controlling, generating instructions, providing signals, e.g., a pulse-width-modulated (PDM signal), and otherwise provide operations for controlling the charging system 12 to generate the electrical charging power and otherwise perform operations contemplated herein. The controller 66 may include a computer-readable storage medium having a plurality of non-transitory instructions stored thereon, which when executed with one or more processors, may be operable for facilitating the charging circuits and otherwise enabling or directing the operations and processes described herein. The charging circuits 64*a*, 64*b*, 64*n* may comprise components suitable for facilitating the electrical power conversions contemplated herein, and as such, the charging circuits are not necessarily intended to be limited to a particular configuration. One non-limiting aspect of the present disclosure contemplates the charging circuits 64*a*, 64*b*, 64*n* being configured as or including bidirectional converters 64*a*, 64*b*, 64*n*. The bidirectional converters 64*a*, 64*b*, 64*n* may be configured as DC-to-DC, AC-to-AC, AC-to-DC, DC-to-AC, and/or other suitable types of converters 64*a*, 64*b*, 64*n*.

Figure 3:
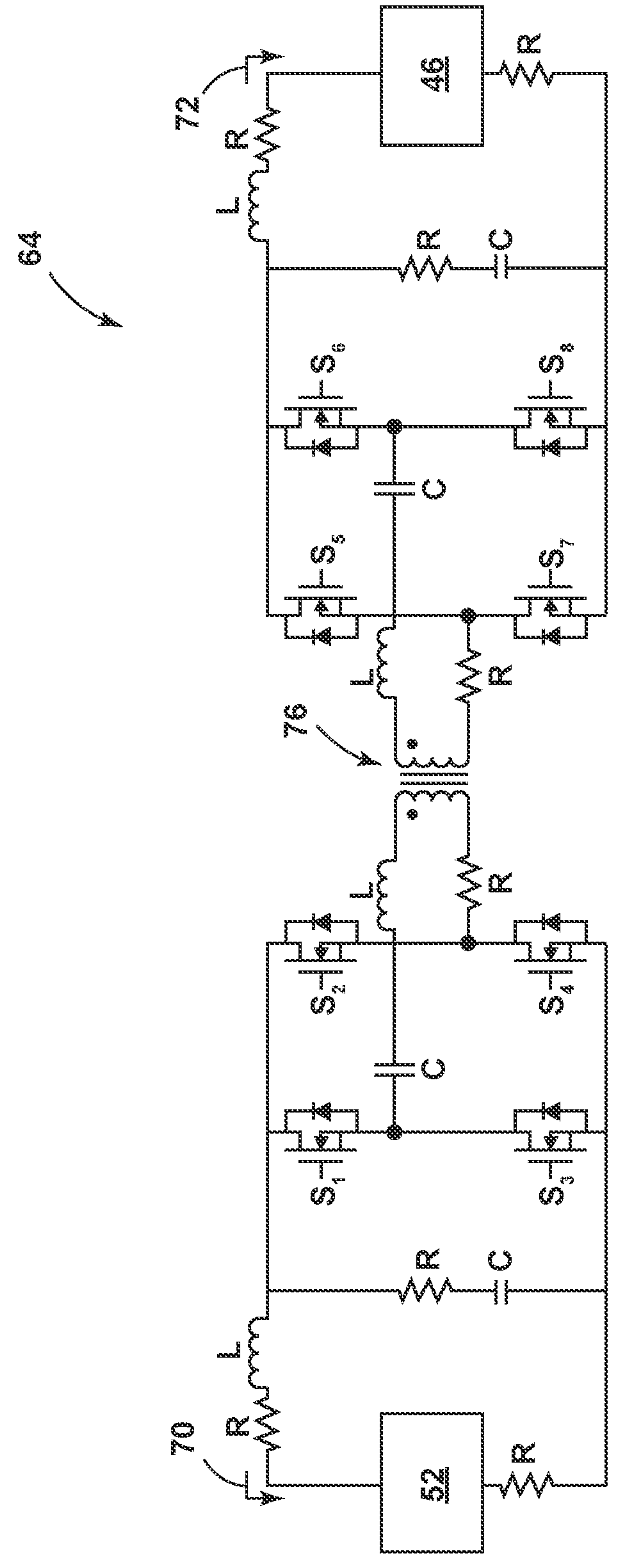
FIG. 3 illustrates a circuit diagram of a bidirectional converter in accordance with one non-limiting aspect of the present disclosure.

FIG. 3 illustrates a circuit diagram of a bidirectional converter 64 in accordance with one non-limiting aspect of the present disclosure. The bidirectional converter 64 may be configured as a buck-boost type of converter configured to output a charging current 70 to one of the battery modules 52*a*, 52*b*, 52*n* when controlled according to a charging mode and to output a discharging current 72 to the LV bus 46 when controlled according to a discharging mode. The charging electric power provided from the bidirectional converters 64*a*, 64*b*, 64*n* to each of the modules 52*a*, 52*b*, 52*n* may be proportional to the charging current 70 and/or voltage output therefrom, and the discharge electrical power provided from the bidirectional converters 64*a*, 64*b*, 64*n* to the LV bus 46 and/or the receptacles may be proportional to the discharge current 72 and/or voltage. The buck-boost configuration of the bidirectional converter 64 may correspond with that commonly employed in the art with respect to including a plurality of switches S operable in response to a PWM signal from the controller 66 to selectively buck and boost electrical power across a transformer 76. The use of such a bidirectional converter 64, i.e., a converter having circuit componentry electrically isolated from each other via a transformer 76, may be beneficial in enabling the exchange of electrical power between the HV bus 18/RESS 14 and the LV bus 46 without the use of a common ground i.e., the bidirectional converters 64*a*, 64*b*, 64*n* may have a ground electrically isolated from a ground of the RESS 14. While not specifically identified with reference numerals, the buck-boost converter 64 may include additional circuit components, such as but not necessarily limited to resistors R, capacitors C, inductors I, etc. arranged according to selectable design parameters.

Figure 4:
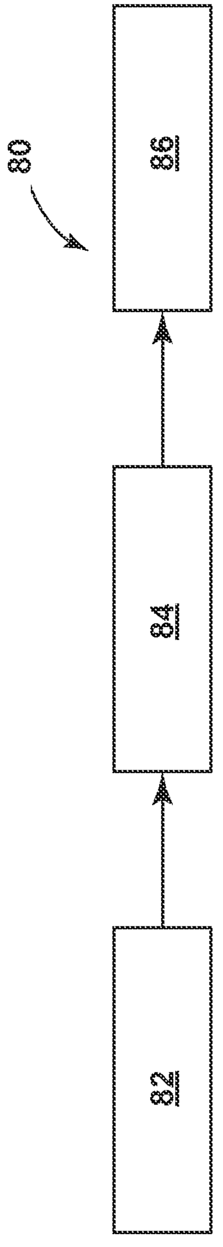
FIG. 4 illustrates a flowchart of a method for charging and discharging in accordance with one non-limiting aspect of the present disclosure.

FIG. 4 illustrates a flowchart of a method 80 for charging and discharging the HV RESS 14 with the LV charging system 12 in accordance with one non-limiting aspect of the present disclosure. Block 82 relates to the controller 66 or other device onboard the vehicle 10 performing a powering assessment to determine whether a need exists for utilizing the LV charging system 12 to facilitate charging and/or discharging the HV RESS 14. One aspect of the present disclosure contemplates utilizing the LV charging system 12 when a need arises for charging the HV RESS 14 or jumpstarting the modules 52*a*, 52*b*, 52*n* (or controllers included thereon) or other devices associated with the HV bus 18 as well as when a need arises for discharging the HV RESS 14 to electrically power devices connected to the LV bus 46 and/or via the receptacles 11*a*, 11*b*. Block 84 relates to the controller 66 performing a strategy operation associated with determining a desired control mode or sequence of control modes for the LV charging system 12 to facilitate charging, discharging, or shutting down/idling the HV RESS 14. Block 86 relates to a power execution process whereby the controller 66 may selectively direct the LV charging system 12 between charging, discharging, and/or idling modes to meet the power need and depending on a wide variety of vehicle 10 powering limits, demands, etc. The controller 66 may be configured in this manner to selectively adjust operation of the LV charging system 12 to meet powering demands of the vehicle 10, which may include switching the LV charging system 12 between various modes of operation.

Figure 5:
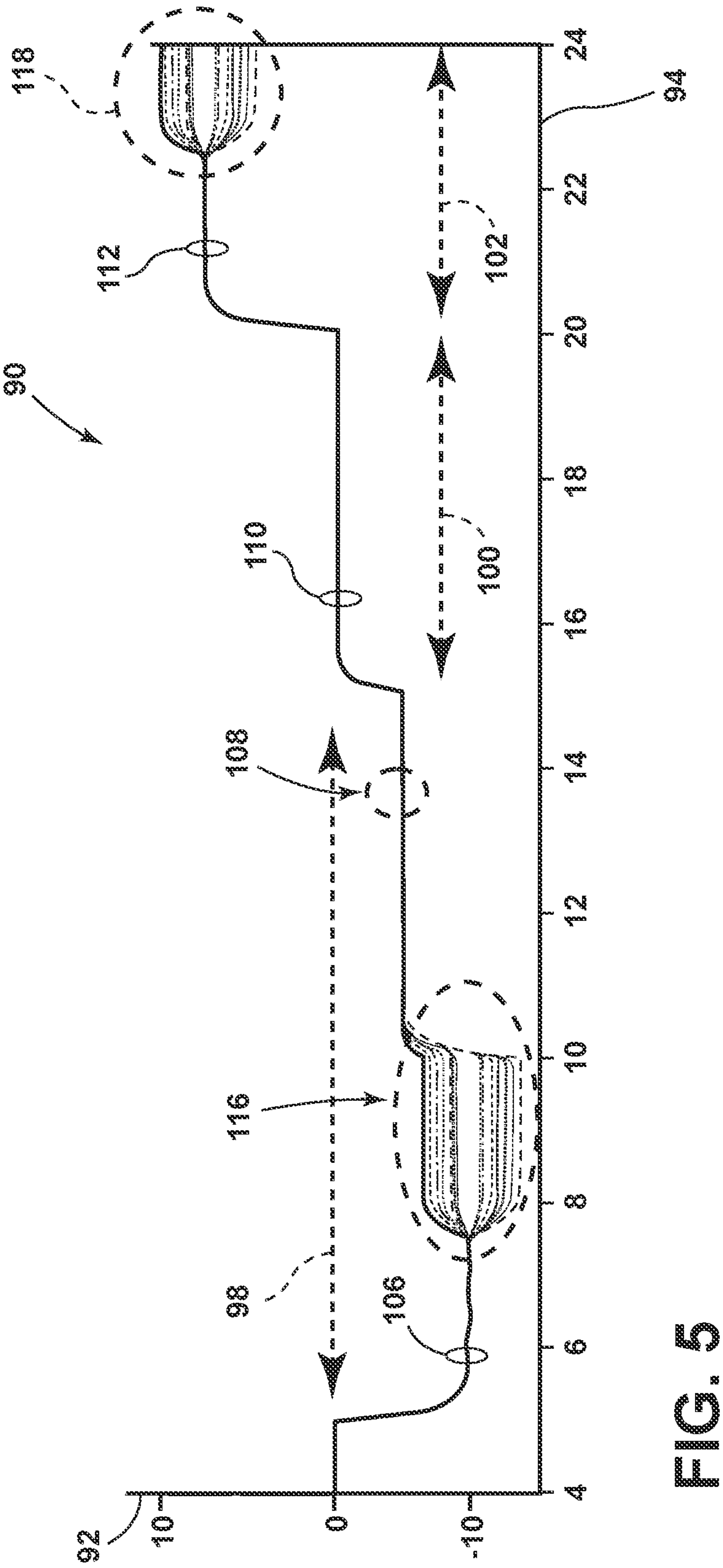
FIG. 5 illustrates a graph of a powering sequence in accordance with one non-limiting aspect of the present disclosure.

FIG. 5 illustrates a graph of a powering sequence 90 in accordance with one non-limiting aspect of the present disclosure. The graph is shown with a vertical axis 92 representing current in amperes (A) and a horizontal axis 94 representing time in milliseconds (msec). The use of amperes and milliseconds are intended to be exemplary indicators for representing the charging, discharging, and idling of electrical power between the HV RESS 14, the LV charging system 12, the HV bus 18, the LV bus 46, and the receptacles 11*a*, 11*b*. The vertical axis 92 could represent voltage or power and the horizontal axis 94 could represent larger intervals of time, triggering events, etc. The powering sequence 90 may be representative of how the controller 66 may selectively direct operations of the LV charging system 12 to facilitate charging, discharging, and idling the HV RESS 14, which may be respectively corresponding with the illustrated charging mode 98, idle mode 100, and LV load support mode 102. The charging, idle, and LV load support modes 98, 100, 102 are illustrated as occurring sequentially, however, the controller 66 may be operable for switching between the modes 98, 100, 102 according to differing sequences, patterns, etc. The charging mode 98 may correspond with controlling the LV charging system 12 to provide charging electrical power to the HV RESS 14. The idle mode 100 may correspond with the LV charging system 12 monitoring conditions without correspondingly charging or discharging electrical power to/from the HV RESS 14. The LV load support mode 102 may correspond with controlling the LV charging system 12 to drawing power from the HV RESS 14 and based thereon provide DC or AC electrical power to the LV bus 46 and/or the receptacles 11*a*, 11*b*.

The charging mode 98 may correspond with the controller 66 independently controlling the bidirectional converters 64*a*, 64*b*, 64*n* to each provide a charging current output to one of the modules 52*a*, 52*b*, 52*n*. The controller 66 may be configured to control the bidirectional converters 64*a*, 64*b*, 64*n* such that the charging current output therefrom may be selectively determined based on the charging need, configuration, etc. of the HV RESS 14. In the event the HV RESS 14 is configured as a battery pack, under some circumstances it may be desirable to charge each of the battery cells associated with each of the modules 52*a*, 52*b*, 52*n* with charging electrical power having approximately equal amount of charging current, voltage, or power, and under other circumstances it may be desirable to charge one or more of the modules 52*a*, 52*b*, 52*n* with charging electrical power having differing amounts of charging current, voltage, or power. In other words, the charging mode 98 may include providing a common or the same amount of charging current from the bidirectional converters 64*a*, 64*b*, 64*n* to each of the modules 52*a*, 52*b*, 52*n* or providing an uncommon or different amount of charging current from one or more the bidirectional converters 64*a*, 64*b*, 64*n* to a corresponding one or more of the modules 52*a*, 52*b*, 52*n*.

Portions 106, 108, 110, 112 of the graph corresponding with a singular line may be used to represent when the charging current is being provided at an approximately equal amount. The amount of charging current or charging power may be selected during the charging mode 98 may be variable depending on a state of charge (SOC), temperature, or other variable selectable for the HV RESS 14 or individually for the modules 52*a*, 52*b*, 52*n*, e.g., based on differences between SOC and/or temperature and corresponding SOC and temperature thresholds. Portions 116, 118 of the graph corresponding with multiple lines may be used to represent differing amounts of the charging current respectively provided to the modules 52*a*, 52*b*, 52*n* from different ones of the bidirectional converters 64*a*, 64*b*, 64*n*. The amount of charging current or charging power provided to each of the modules 52*a*, 52*b*, 52*n* may be variable on a module-by-module basis, such as based on differences between SOC and/or temperature and corresponding SOC and temperature thresholds set for each of the modules 52*a*, 52*b*, 52*n*. This capability to selectively control the charging current and power may be beneficial in enabling the modules 52*a*, 52*b*, 52*n* to be powered equally and/or unequally. The capability to unequally or selectively power each of the modules 52*a*, 52*b*, 52*n* may be beneficial in accounting for performance differences, disparate cell degradation, temperature variances, and a wide range of other variables that may cause the modules 52*a*, 52*b*, 52*n* to operate differently. Charging the modules 52*a*, 52*b*, 52*n* with differing amounts of current may enable each module to obtain an approximately equal charge, SOC, temperature, etc., which may be desirable for operating the modules 52*a*, 52*b*, 52*n* in a more cohesive or common manner.

The LV load support mode 102 may correspond with the controller 66 independently controlling the bidirectional converters 64*a*, 64*b*, 64*n* to each provide a discharging DC or AC current to the LV bus 46 and/or receptacles 11*a*, 11*b* based on electrical power provided from the module 52*a*, 52*b*, 52*n* associated therewith. It may be desirable to discharge each of the modules 52*a*, 52*b*, 52*n* with at an approximately equal amount of discharging current, voltage, or power, and under other circumstances it may be desirable to discharge one or more of the modules 52*a*, 52*b*, 52*n* with discharging electrical power having differing amounts of charging current, voltage, or power. In other words, the discharging LV support mode 102 may include providing a common or the same amount of discharging current from the bidirectional converters 64*a*, 64*b*, 64*n* to the LV bus 46 and/or receptacles 11*a*, 11*b* and providing an uncommon or different amount of charging current from one or more of the bidirectional converters 64*a*, 64*b*, 64*n* to a corresponding one or more of the modules 52*a*, 52*b*, 52*n*. The discharging currents in the LV power mode 102 may be selectively determined in a manner similar to that described above with respect to the charging currents and powers. The idle mode 110 may correspond with the LV charging system 12 monitoring operation of the HV RESS 14 and/or the controller 66 awaiting instructions to take action such that the charging currents associated with the bidirectional converters 64*a*, 64*b*, 64*n* may be zero, i.e., idle.

As supported above, the present disclosure relates to a charging system operable for LV-based charging of HV battery systems, such as via APM or distributed APM. The charging system include the use of bidirectional power converters to transfer power from 12V chargers into battery module and/or as jump system at start up and to support control and protection enablement. For the case of no LV battery, the charging system may utilize a jump charge port that is protected against reverse polarity and overvoltage and is accessed in a secured place such as within or adjacent to a normal charge port. The charging system may be beneficial in minimizing EV range anxiety due to an ability to charging the EV using LV sources, e.g., a portable battery, via jumper cables to another vehicle LV battery, or with other sources that may be easier to obtain or more mobile. The LV charging system may provide a solution to eliminate the need for some types of HV charging systems that a vehicle may otherwise employ. Accordingly, the proposed system may be used for applying charging power to LV grid of the battery, which may undergo power conversion in the isolated bidirectional DC-DC converters and into a plurality of battery modules each of which can receive charging power.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A low voltage (LV) charging system for charging a high voltage (HV) rechargeable energy storage system (RESS), comprising:

an input configured for receiving LV electrical power from a LV source;

a distributed converter system configured for charging a plurality of modules of the HV RESS via a plurality of charging circuits, each charging circuit configured for separately charging one of the modules with a charging electrical power derived from converting the LV electrical power; and a controller configured for individually controlling the charging electrical power provided via each of the charging circuits, such that the charging electrical power of the each charging circuit is provided at a greater voltage than the LV electrical power.

2. The LV charging system according to claim 1, wherein:

each charging circuit includes a bidirectional converter configured for converting the LV electrical power to the charging electrical power.

3. The LV charging system according to claim 2, wherein: the controller is configured for independently controlling a charging current output from each of the bidirectional converters via the charging circuit associated therewith.

4. The LV charging system according to claim 3, wherein: the controller is configured for controlling each of the bidirectional converters to simultaneously output the charging current at an approximately equal amount.

5. The LV charging system according to claim 3, wherein: the controller is configured for controlling each of the bidirectional converters to simultaneously output the charging current at differing amounts.

6. The LV charging system according to claim 5, wherein: the controller is configured for:

determining a temperature for each of the modules;

determining a temperature threshold for each of the modules; and determining the differing amounts individually for each of the charging currents based on a difference between the temperature and the temperature threshold for the module associated therewith.

7. The LV charging system according to claim 5, wherein: the controller is configured for:

determining a state of charge (SOC) for each of the modules;

determining a SOC threshold for each of the modules; and determining the differing amounts individually for each of the charging currents based on a difference between the SOC and the SOC threshold for the module associated therewith.

8. The LV charging system according to claim 7, wherein: each of the modules correspond with a grouping of one or more different ones of a plurality of battery cells included as part of the HV RESS.

9. The LV charging system according to claim 2, wherein: the bidirectional converters are direct current (DC)-to-DC converters operable for converting the LV electrical power to the charging electrical power, the charging electrical power of each converter being provided at a lower voltage than a HV output of the HV RESS.

10. The LV charging system according to claim 2, wherein:

the bidirectional converters are alternating current (AC)-to-direct current (DC) converters for converting the LV electrical power to the charging electrical power, the charging electrical power of each converter being provided at a greater voltage than the LV electrical power and at lower voltage than a HV output of the HV RESS.

11. The LV charging system according to claim 2, wherein:

the bidirectional converters have a ground electrically isolated from a ground of the HV RESS.

12. The LV charging system according to claim 1, wherein:

the charging electrical power is operable for jumpstarting a RESS controller associated with each of the modules.

13. The LV charging system according to claim 1, further comprising:

a port protection module configured for electrically interconnecting the LV source with the input, the port protection module including at least one of a reverse polarity and an over voltage prevention circuit configured for preventing a reverse polarity connection between the LV source and the input.

14. The LV charging system according to claim 13, wherein:

the HV RESS, the distributed converting system, the input, and the port protection module are onboard a vehicle, the vehicle configured to power a traction motor with HV electrical power provided via the HV RESS; and the LV source is removably connected to the port protection module via receptacles included onboard the vehicle.

15. A low voltage (LV) charging system for charging a high voltage (HV) rechargeable energy storage system (RESS) included onboard a vehicle, the RESS configured for providing HV electrical power to a traction motor to propel the vehicle, comprising:

an input configured for receiving LV electrical power from a LV source removably connected to receptacles included onboard the vehicle, the LV source being independent of a LV RESS included as part of a LV bus of the vehicle;

a distributed converter system configured for charging the HV RESS via a plurality of bidirectional converters, each bidirectional converter configured for separately charging one of a plurality of modules of the HV RESS with a charging electrical power derived from converting the LV electrical power; and a controller configured for individually controlling the charging electrical power provided via each of the bidirectional converters, such that the charging electrical power of the each charging circuit is provided at a greater voltage than the LV electrical power.

16. The LV charging system according to claim 15, wherein:

the controller is configured for controlling each of the bidirectional converters to simultaneously output a charging current to the module associated therewith at an approximately equal amount when at least one of a state of charge (SOC) and a temperature of each of the modules is approximately equal and to simultaneously output the charging current at differing amounts when at least one of the SOC and the temperature of each of the modules is unequal.

17. The LV charging system according to claim 16, wherein:

the bidirectional converters are configured for converting HV electrical power provided from the HV RESS to direct current (DC) electrical power suitable for distribution over the LV bus.

18. The LV charging system according to claim 16, wherein:

the bidirectional converters are configured for converting HV electrical power provided from the HV RESS to at least one of direct current (DC) electrical power and alternating current (AC) electrical power suitable for distribution offboard the vehicle via the receptacles.

19. The LV charging system according to claim 18, wherein:

the controller is configured for controlling each of the bidirectional converters to simultaneously output current to the receptacles at differing amounts.

20. A charging assembly for charging a battery pack included onboard a vehicle, the battery pack configured for powering a traction motor to propel the vehicle, comprising:

an input configured for receiving input electrical power from a source removably connected to receptacles of the vehicle;

a distributed converter system configured for charging a plurality of modules of the battery pack via a plurality of bidirectional converters, each bidirectional converter configured for separately charging one of the modules with a charging current derived from converting the input electrical power; and a controller configured for individually controlling the charging current provided via each of the bidirectional converters, such that the charging electrical power of the each charging circuit is provided at a greater voltage than the LV electrical power and at lower voltage than a HV output of the HV RESS.

* * * * *